(12) United States Patent
Lee et al.

(10) Patent No.: US 9,304,182 B2
(45) Date of Patent: Apr. 5, 2016

(54) HYBRID DIRECTION IDENTIFYING APPARATUS AND METHOD

(71) Applicant: ELECTRONICS AND TELECOMMUNICATIONS RESEARCH INSTITUTE, Daejeon (KR)

(72) Inventors: Jeom Hun Lee, Daejeon (KR); In One Joo, Daejeon (KR); Myung Soon Kim, Daejeon (KR); Cheon Sig Sin, Daejeon (KR); Sang Uk Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 451 days.

(21) Appl. No.: 13/766,004

(22) Filed: Feb. 13, 2013

(65) Prior Publication Data
US 2013/0207844 A1   Aug. 15, 2013

(30) Foreign Application Priority Data

Feb. 15, 2012 (KR) ............... 10-2012-0015227
Nov. 13, 2012 (KR) ............... 10-2012-0127955

(51) Int. Cl.
| | | |
|---|---|---|
| G01S 5/04 | (2006.01) | |
| G01S 3/48 | (2006.01) | |
| G01S 3/58 | (2006.01) | |
| G01S 5/14 | (2006.01) | |

(52) U.S. Cl.
CPC ... *G01S 3/48* (2013.01); *G01S 3/58* (2013.01); *G01S 5/04* (2013.01); *G01S 5/14* (2013.01)

(58) Field of Classification Search
CPC ............... G01S 5/04; G01S 3/52; G01S 5/02; G01S 3/58; G01S 5/14
USPC ......................................... 342/445, 418, 422
See application file for complete search history.

(56) References Cited

U.S. PATENT DOCUMENTS

| | | | | |
|---|---|---|---|---|
| 3,611,389 A | * | 10/1971 | Coors et al. .................... | 343/716 |
| 4,978,963 A | * | 12/1990 | Thorpe ........................ | 342/433 |
| 5,541,608 A | * | 7/1996 | Murphy et al. ............... | 342/442 |
| 5,687,196 A | * | 11/1997 | Proctor et al. ................ | 375/347 |

(Continued)

FOREIGN PATENT DOCUMENTS

KR   1020100054443 A   5/2010

OTHER PUBLICATIONS

Joong-Soo Lim et al; "A Technology of Microwave Direction Finding with Circular Array Combination Method", 7 pages Jun. 16, 2005, Copyright 2005 NuriMedia Co., Ltd.

*Primary Examiner* — Harry Liu
(74) *Attorney, Agent, or Firm* — Ladas & Parry LLP

(57) ABSTRACT

A hybrid direction apparatus and method that rapidly and accurately detects a direction of a radio signal source based on a direction detecting scheme by comparing an amplitude or signal strength, a virtual Doppler scheme, a phase difference comparison scheme while removing an ambiguity based on an amplitude or signal strength scheme, and identify a direction relatively precisely based on a phase difference scheme using only two antennas. Also, an arrival direction of a relative radio wave when an arrival direction of a radio wave is vertical to a single rotating axis may be precisely identified by mounting a directional antenna and a phase comparison antenna on the single rotating axis, and rotating the two antennas.

11 Claims, 8 Drawing Sheets

(56) References Cited

U.S. PATENT DOCUMENTS

| | | | |
|---|---|---|---|
| 2002/0196185 A1* | 12/2002 | Bloy | 342/435 |
| 2004/0085243 A1* | 5/2004 | Kuokkanen et al. | 342/457 |
| 2005/0156780 A1* | 7/2005 | Bonthron et al. | 342/107 |
| 2007/0273576 A1* | 11/2007 | Struckman et al. | 342/156 |
| 2013/0115969 A1* | 5/2013 | Holmes et al. | 455/456.1 |

* cited by examiner

HYBRID DIRECTION IDENTIFYING APPARATUS AND METHOD

CROSS-REFERENCE TO RELATED APPLICATIONS

This application claims the priority benefit of Korean Patent Application No. 10-2012-0015227, filed on Feb. 15, 2012, and Korean Patent Application No. 10-2012-0127955, filed on Nov. 13, 2012, in the Korean Intellectual Property Office, the disclosures of which are incorporated herein by reference.

BACKGROUND

1. Field of the Invention

The present invention relates to a hybrid direction identifying apparatus and method that rapidly and accurately detects a direction of a radio signal source based on a direction detecting scheme by comparing an amplitude or a signal strength, a virtual Doppler scheme, a radio phase interferometry scheme, that is, a phase difference comparison scheme, and the like.

2. Description of the Related Art

A radio direction identifying method may use an angle of arrival (AoA) scheme, and the AoA scheme may include an amplitude or signal strength comparison scheme, a Doppler scheme, a phase comparison scheme, and the like. An accuracy of the amplitude or signal strength comparison scheme may be enhanced as a size of an antenna increases, in particular, when a 3 decibel (dB) beam width deteriorates, since a direction is set to be a point at which a signal strength is at maximum in a state in which a directional antenna is rotated or fixed. In the Doppler scheme, a higher precision may be achieved with an increase of a rotation per minute (RPM) and a rotation radius, since a circular arrayed omni-directional antenna is required to be rotated electrically to make a virtual Doppler. The phase comparison scheme may identify a direction of a signal by measuring a phase difference of the signal arriving to at least two fixed omni-directional antennas as shown in FIG. 1 and Equation 1.

$$\Delta\phi = -\frac{2\pi d}{\lambda}\sin(\varphi) \quad \text{[Equation 1]}$$

In Equation 1, $\Delta\phi$ denotes a phase difference, $\sigma$ denotes an AoA, and d denotes a distance between two antennas.

The amplitude or signal strength comparison scheme of the AoA scheme may have a limit in terms of a size of an antenna since a highly directional antenna is required for a high degree of precision. The virtual Doppler scheme may be complicated and costly since thousands to tens of thousands of RPM electrical rotations would be required. A phase difference comparison scheme of two fixed antennas may require at least five circular array antennas to detect all directions in a range of 0 degrees to 360 degrees, and achieve a higher precision as a number of array antennas increases. Accordingly, as the number of array antennas increases, a number of radio frequency (RF) elements may become greater and signal processing may become increasingly complicated.

Achieving a certain degree of precision using the amplitude or signal strength comparison scheme, the Doppler scheme, and the phase difference comparison scheme of two fixed antennas may face restrictions due to a high cost and an implementation of the schemes. The amplitude or signal strength comparison scheme of the AoA scheme may require an antenna having a relatively great aperture, and the phase difference comparison scheme of two fixed antennas in which a virtual Doppler and at least five array antennas are present may be complicated and require a high cost. The virtual Doppler scheme and multiple array antennas scheme, that is, at least five, may be complicated and require a high cost since at least five antennas are required to be arrayed and configuration of a great number of components is required to obtain a precision of one to three degrees.

The amplitude or signal strength comparison scheme may enable an AoA with a low precision, although fast, without an ambiguity. In the phase difference comparison scheme of two fixed antennas, when a distance d is $\lambda/2$ in Equation 1, an ambiguity may be 180 degrees, and $\phi$ being an AoA may have an error as shown in Equation 2 and FIG. 2 due to a mutual coupling between antennas.

$$\Delta\varphi \approx -\frac{\lambda\Delta\sigma}{2\pi d\cos(\varphi)} \quad \text{[Equation 2]}$$

In Equation 2, $\Delta\sigma$ denotes a phase measurement error, and $\phi$ denotes an AoA. Accordingly, an error $\Delta\sigma$ of an AoA may increase as an incident angle $\phi$, the AoA, of a radio wave increases when an array antenna is fixed. However, when the incident angle $\phi$ is zero, that is, vertical to an array antenna axis, the error $\Delta\sigma$ may be at a minimum. The phase difference comparison scheme of two fixed antennas may use a principle in which an error becomes the minimum when a signal enters two antennas simultaneously. More particularly, the phase difference comparison scheme of two fixed antennas may identify a direction at which a phase difference is zero by rotating an antenna.

SUMMARY

An aspect of the present invention provides a hybrid direction identifying apparatus and method that identifies an approximate direction rapidly while removing an ambiguity based on an amplitude or signal strength scheme, and precisely identifies a direction based on a phase difference scheme using only two antennas.

According to an aspect of the present invention, there is provided a hybrid direction identifying apparatus, the apparatus including a rotating unit mounted with one log period (LP) antenna, and an two dipole array antennas, and a signal processing unit to identify a direction by searching for a point at which a direction angle between the dipole array antennas is "0", in a direction in which a signal strength of the LP antenna is relatively great while the rotating unit is being rotated.

According to an aspect of the present invention, there is provided a hybrid direction identifying method, the method including mounting, by a rotating unit, one LP antenna, and two dipole array antennas, and identifying, by a signal processing unit, a point at which a direction angle between the two dipole array antennas is "0", in a direction in which a signal strength of the LP antenna is relatively great while the rotating unit is being rotated.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
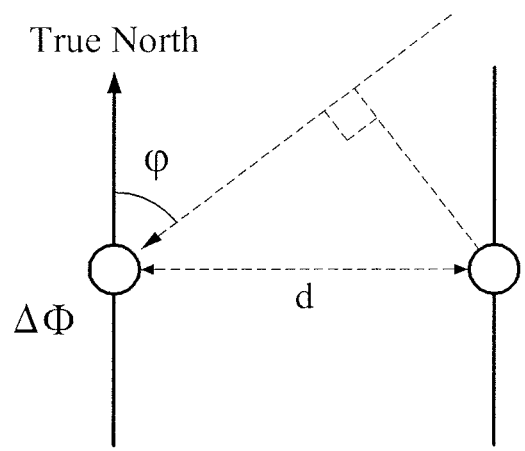
FIG. 1 is a diagram illustrating an example of radio phase interferometry according to an embodiment of the present invention.
Figure 2:
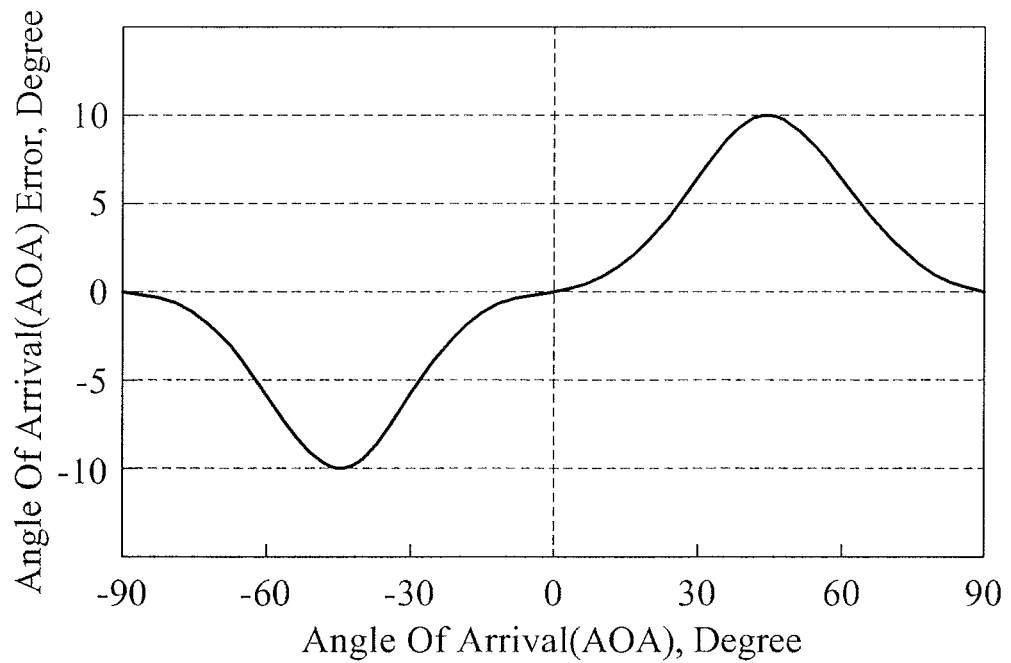
FIG. 2 is a graph illustrating an error due to a mutual coupling of dipole array antennas according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

The embodiments of the present invention may identify an approximate direction rapidly based on an amplitude or signal strength comparison scheme and may identify a precise direction in which a phase difference is zero based on a phase comparison scheme, by mounting two types of antennas, that is, a directional antenna and a phase comparison antenna, on a single rotation axis and setting the rotation axis to move within a set range from "0" degrees to "360" degrees manually, or rotating the rotation axis with a rotator.

As an example, the embodiments of the present invention may use a log period (LP) antenna as a directional antenna to apply the amplitude or signal strength comparison scheme, and may use two dipole array antennas to apply the phase comparison scheme.

Figure 3:
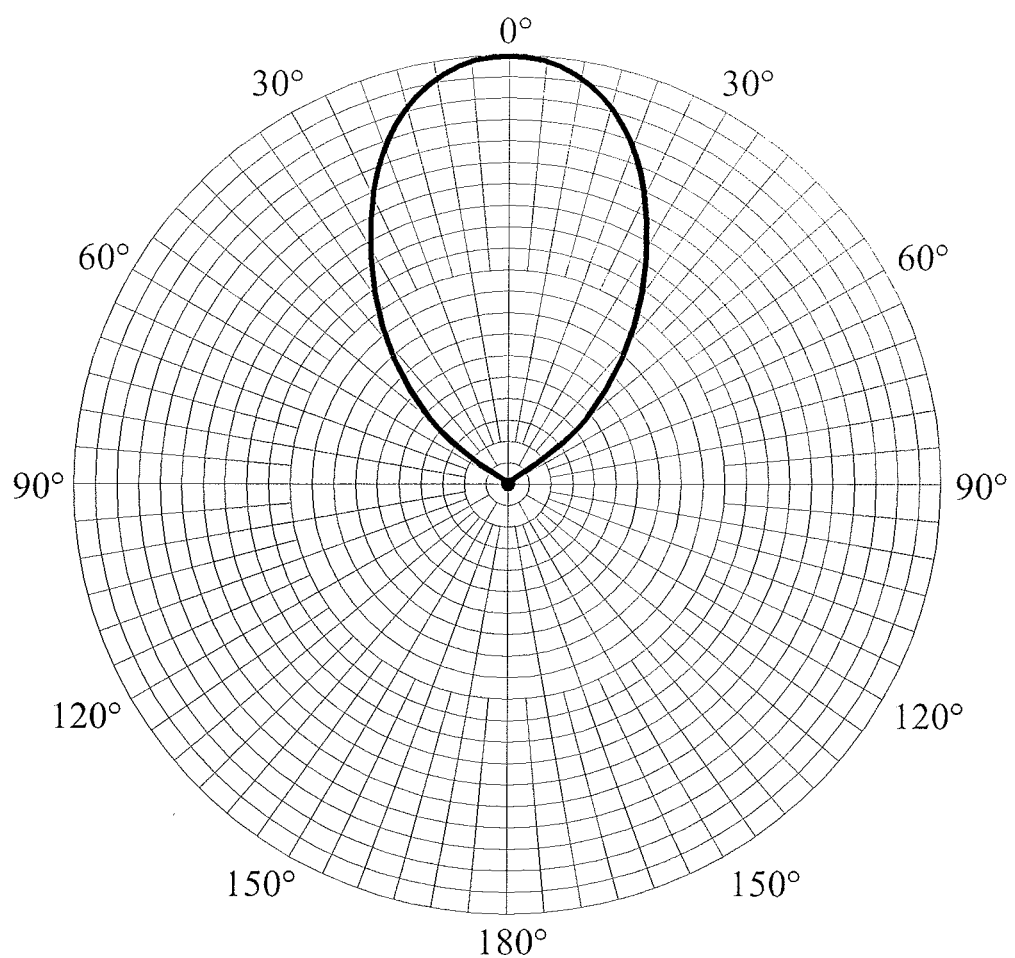
FIG. 3 is an example diagram illustrating a characteristic of radiation pattern of a log period (LP) antenna according to an embodiment of the present invention.
Figure 4:
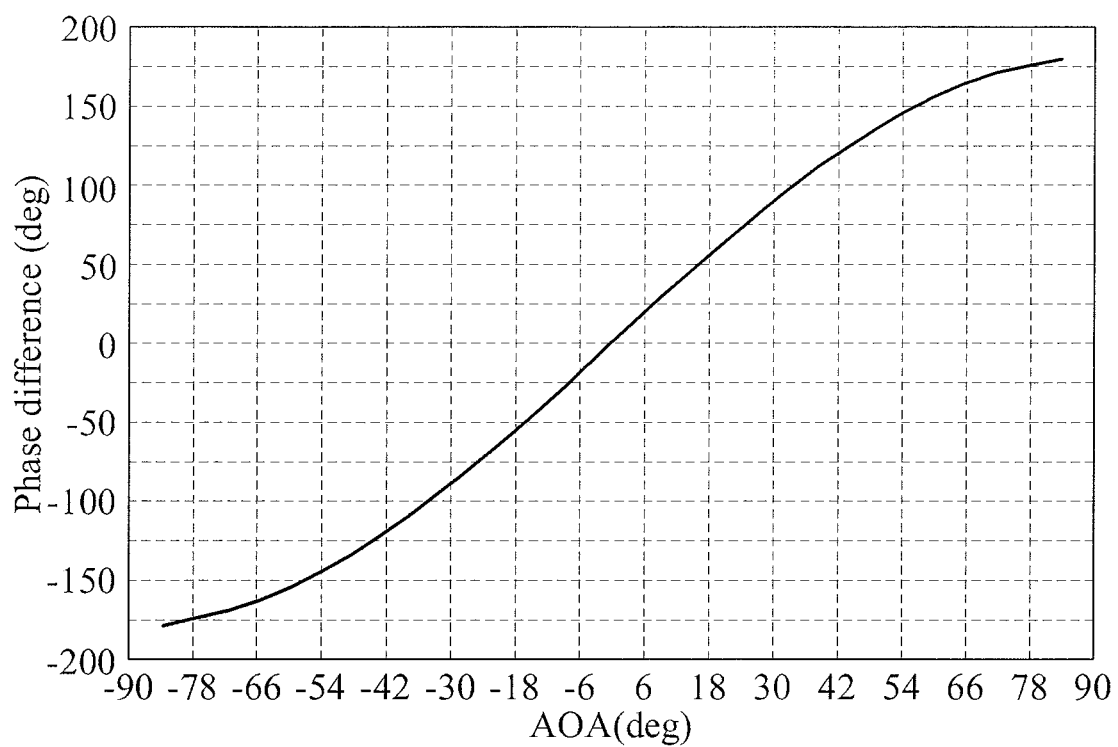
FIG. 4 is a graph illustrating a relationship between a phase difference and an angle of arrival (AoA) when d is $\lambda/2$, according to an embodiment of the present invention.

An LP antenna pattern may be characterized by a 3 decibel (dB) beam width in a range of 30 to 40 degrees as shown in FIG. 3. When a dipole antenna array is fixed, in case of a distance d being $\lambda/2$ in Equation 1, a relation between a phase difference and an angle of arrival (AoA) may be as shown in FIG. 4.

However, in an instance of two antennas being rotated, when a direction from which a radio wave arrives is vertical to a dipole array axis, a phase difference arriving at the two antennas may be zero. Based on the phase difference "0" and the aforementioned Equation 1, an AoA direction angle may be zero degrees based on an array antenna, and may be 100 degrees based on a northern direction.

Figure 5:
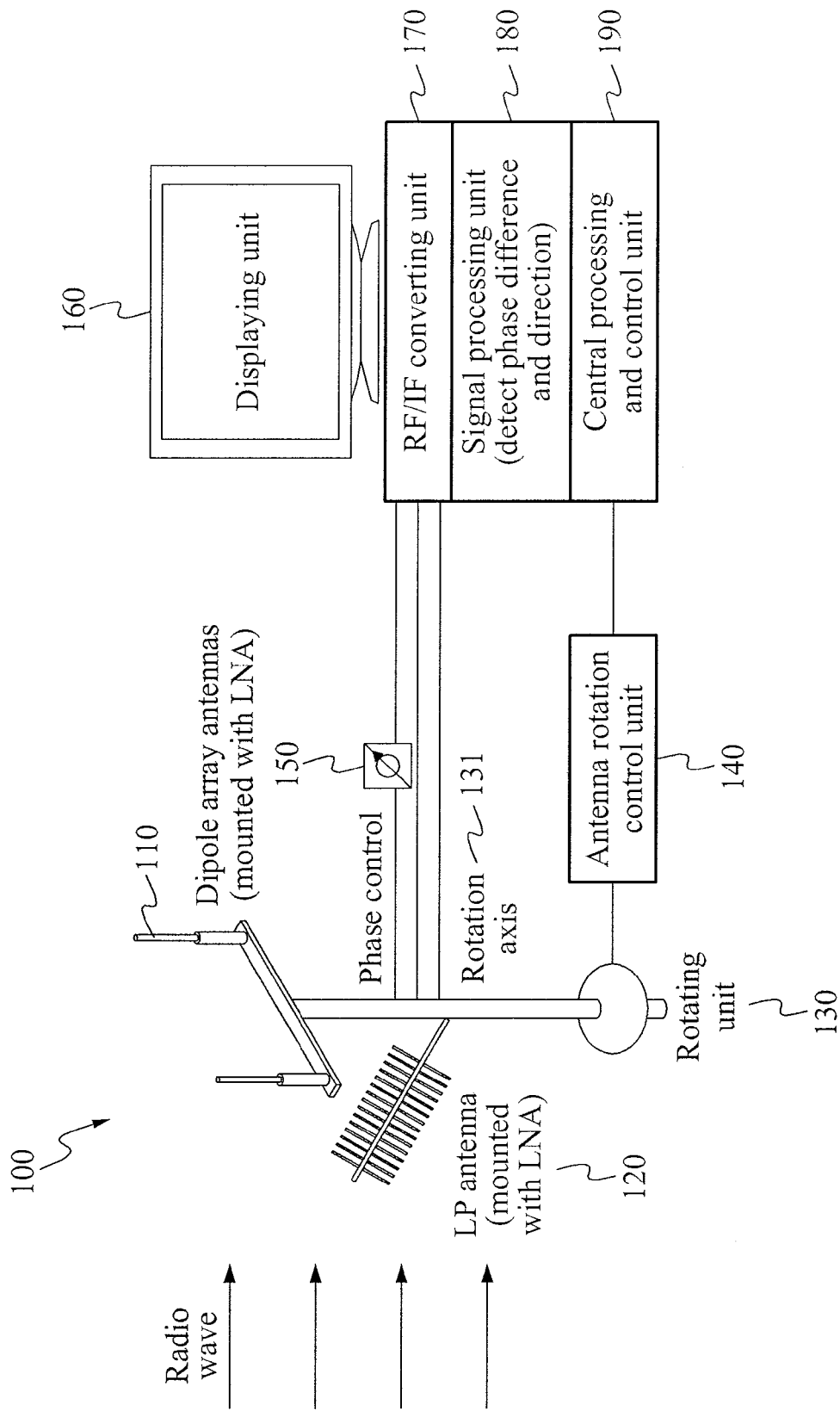
FIG. 5 is a block diagram illustrating a configuration of a hybrid direction identifying apparatus according to an embodiment of the present invention.

FIG. 5 is a block diagram illustrating a configuration of a hybrid direction identifying apparatus according to an embodiment of the present invention.

Referring to FIG. 5, the hybrid direction identifying apparatus may mount an LP antenna 120 and two dipole array antennas 110 on an axis 131 of an antenna rotating unit 130. The LP antenna 120 may be mounted to be vertical to the dipole array antennas 110.

A phase controller 150 may control a signal path from a wireless output of the two dipole array antennas 110 to a digital input of a signal processing unit 180 to a predetermined level. Since the signal path from an output of two dipole antennas, for example, an input of a low noise amplifier (LNA) to RF/IF Converter and an analog to digital converter (ADC) input is required to be consistent, a distance of the signal path may be controlled to be consistent using the phase controller 150 of FIG. 5.

Figure 6:
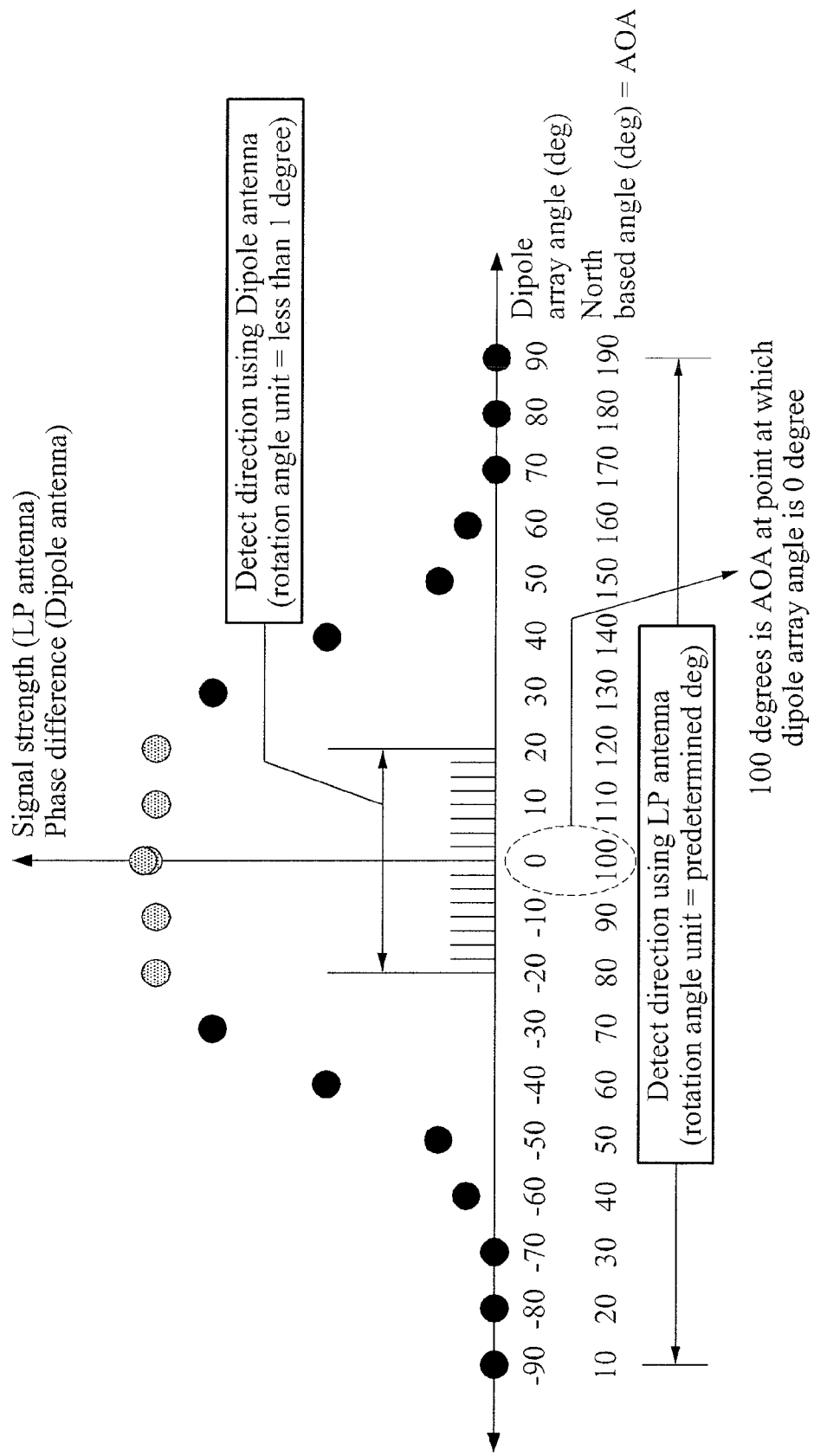
FIG. 6 is an example diagram illustrating a dipole array antenna angle and an AoA according to an embodiment of the present invention.

A central processing and control unit 190 may rotate an antenna using the antenna rotating unit 130 by controlling an antenna rotation control unit 140. A signal received by the LP antenna 120 may be amplified through an LNA, converted to an IF frequency in an RF/IF converting unit, and analog-digital conversion (ADC) signal processed in the signal processing unit 180. Subsequently, a displaying unit 160 may display an approximate direction with respect to the signal ADC signal processed as an LP antenna angle and an AoA as shown in FIG. 6.

Simultaneously, a signal received by the dipole array antennas 110 may be amplified through the LNA, converted to an IF in the RF/IF converting unit 170, and ADC signal processed in the signal processing unit 180. Subsequently, the displaying unit 160 may display an approximate direction with respect to the signal that is ADC signal processed as a phase difference arriving at the two dipole array antennas and a dipole array direction based on a fact that a boresight of the directional antenna and the phase comparison antenna is zero degree.

The signal processing unit 180 may identify a point at which a direction angle of the dipole array antennas 110 is zero by controlling a rotation adjacent to a direction identified by the LP antenna 120 based on the principle of Equation 1 and FIG. 4. In this instance, a direction in which the two antennas are pointed based on a direction of true north may be an AoA direction or bearing of a signal source.

Figure 7:
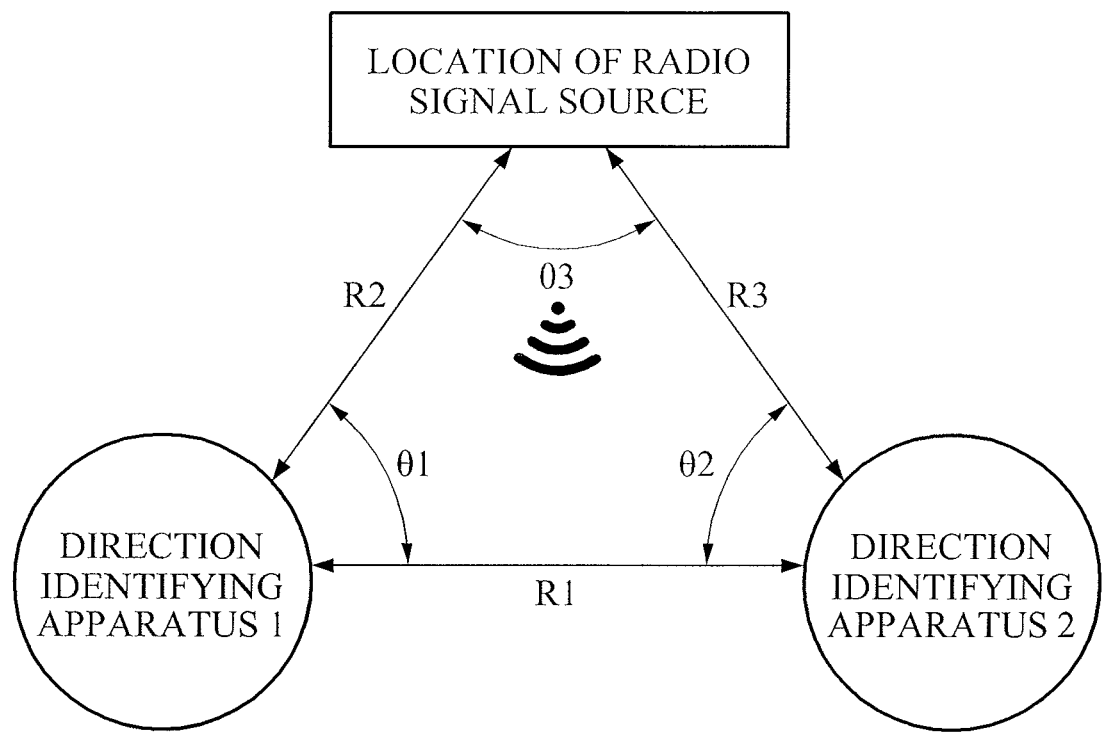
FIG. 7 is an example diagram illustrating a calculation of a location of a radio signal source according to an embodiment of the present invention.

When a direction identifying apparatus is situated on at least two positions as shown in FIG. 7, a location of a radio signal source may be readily identified. An angle $\theta1$ and an angle $\theta2$ may be obtained in a direction detecting apparatus 1 and a direction detecting apparatus 2, respectively, and R1 may be a predetermined distance between the direction detecting apparatus 1 and the direction detecting apparatus 2. When a surface is assumed to be flat, distances R2 and R3 may be readily obtained by a trigonometric formula, for example, the sine law.

Figure 8:
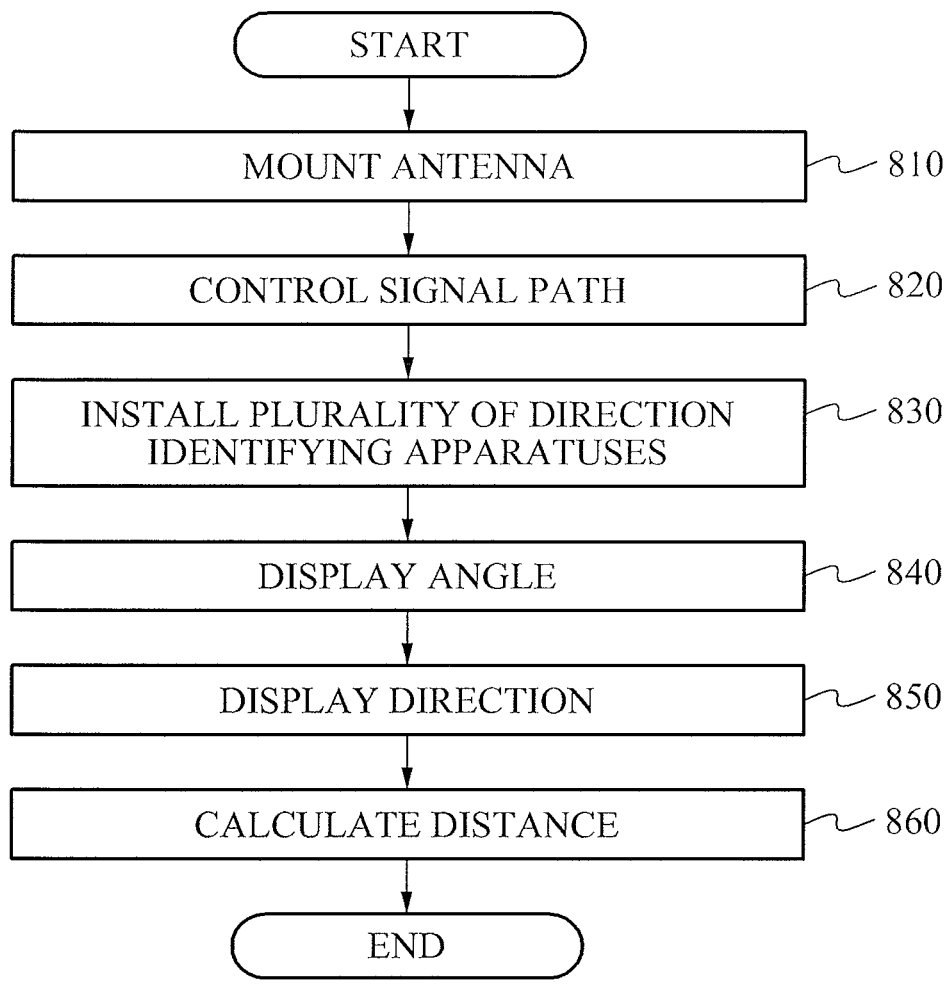
FIG. 8 is a flowchart illustrating a hybrid direction identifying method according to an embodiment of the present invention.

FIG. 8 is a flowchart illustrating a hybrid direction identifying method according to an embodiment of the present invention.

Referring to FIG. 8, operation in which a hybrid direction identifying apparatus identifies a direction of a wireless signal will be described. The hybrid direction identifying apparatus may include a rotating unit and a signal processing unit. The signal processing unit may include an LNA, an RF/IF converting unit, a displaying unit, and a phase controller.

In operation 810, the rotating unit may mount an LP antenna and two dipole array antennas on a rotation axis set to be vertical.

In operation 820, the phase controller may control a signal path from a wireless output of the two dipole array antennas to a digital input of the signal processing unit to a predetermined level.

In operation 830, a plurality of direction identifying apparatuses may be installed at predetermined intervals apart from a radio signal source.

The signal processing unit may identify a point at which a direction angle of the dipole array antennas is zero for a direction in which a signal strength of the LP antenna is relatively great while the rotation axis is being rotated by controlling the rotating unit.

The signal processing unit may include the LNA to amplify a wireless signal, the RF/IF converting unit to convert the amplified wireless signal to an IF signal, and the displaying unit to display an angle and a direction by performing digital signal processing using the IF signal.

The LNA may amplify a signal received by the LP antenna, and the RF/IF converting unit may convert the amplified signal to the IF.

In operation 840, the displaying unit may perform sampling of the IF by the signal processing unit, and may perform digital signal processing of the sampled signal to display an LP antenna angle and an AoA.

The LNA may amplify a signal received by the dipole array antennas, and the RF/IF converting unit may convert the amplified signal to the IF.

In operation 850, the displaying unit may use the LP antenna angle and the AoA for reference, and perform digital signal processing using an IF obtained by detail controlling the dipole array antennas to display a phase difference and a direction of the dipole array antennas.

In operation 860, a calculating unit may calculate an angle with a radio signal source by using the phase difference and the direction of the dipole array antennas for reference, and calculate a distance from the radio signal source by applying a separation distance and an angle between a plurality of direction identifying apparatuses to a trigonometric formula.

According to embodiments of the present invention, it is possible to identify an approximate direction rapidly while removing an ambiguity based on an amplitude or signal strength scheme, and identify a direction relatively precisely based on a phase difference scheme using only two antennas.

According to embodiments of the present invention, it is possible to identify a relative direction from which of a relative radio wave arrives when an arrival direction of a radio wave is vertical to a single rotating axis, by mounting a directional antenna and a phase comparison antenna on the single rotating axis, and rotating the two antennas.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A hybrid direction identifying apparatus, the apparatus comprising:
   a rotating unit mounted with one log period (LP) antennas, and two dipole array antennas; and
   a signal processing unit to identify a direction by searching for a point at which a direction angle between the dipole array antennas is "0", and in a direction in which a signal strength of the LP antenna is stronger than at any other point of rotation while the rotating unit is being rotated.

2. The apparatus of claim 1, wherein the signal processing unit comprises:
   a low noise amplifier (LNA) to amplify a signal received by the LP antenna and the dipole array antenna;
   a radio frequency/intermediate frequency (RF/IF) converting unit to convert the amplified signal to an IF; and
   a displaying unit to display antenna information by performing signal processing using the IF.

3. The apparatus of claim 2, wherein the displaying unit displays an antenna angle of the LP antenna and an angle of arrival (AoA) as the antenna information when the LNA amplifies the signal received by the LP antenna.

4. The apparatus of claim 2, wherein the displaying unit displays a phase difference of the dipole array antenna and an antenna direction of the dipole array antenna as the antenna information when the LNA amplifies the signal received by the dipole array antenna.

5. The apparatus of claim 1, further comprising:
   a phase controller to control a signal path transmitted from a wireless output of the dipole array antenna to a digital input of the signal processing unit, to a predetermined level, that is for calibration of two paths.

6. The apparatus of claim 1, further comprising:
   a calculating unit to calculate a separation distance from a relative direction identifying apparatus and an angle relative to a radio signal source, and apply the calculated separation distance and the calculated angle to a trigonometric formula to calculate a distance from the radio signal source.

7. A hybrid direction identifying method, the method comprising:
   mounting, by a rotating unit, an one period (LP) antenna, and an two dipole array antennas; and
   identifying, by a signal processing unit, a direction by searching for a point at which a direction angle between the dipole array antennas is "0", and in a direction in which a signal strength of the LP antenna is stronger while the rotating unit is being rotated than the signal strength of the LP antenna at any other point of rotation.

8. The method of claim 7, wherein the searching comprises:
   amplifying, by a low noise amplifier (LNA), a signal received by the LP antenna;
   converting, by a radio frequency/intermediate frequency (RF/IF) converting unit, the amplified signal to an IF frequency; and
   displaying, by a displaying unit, an antenna angle of the LP antenna and an angle of arrival (AoA) by performing signal processing using the IF frequency.

9. The method of claim 7, wherein the searching comprises:

amplifying, by an LNA, a signal received by the dipole array antenna;

converting, by an RF/IF converting unit, the amplified signal to an IF frequency; and displaying, by a displaying unit, a phase difference of the dipole array antenna and an antenna direction of the dipole array antenna by signal processing the IF frequency.

10. The method of claim 7, further comprising:

controlling to a predetermined level, by a phase controller, a signal path transmitted from a wireless output of the dipole array antenna to a digital input of the signal processing unit.

11. The method of claim 7, further comprising:

calculating, by a direction identifying apparatus, a separation distance from a relative direction identifying apparatus;

calculating, by the direction identifying apparatus, an angle relative to a radio signal source; and calculating, by the direction identifying apparatus, a distance from the radio signal source by applying the calculated separation distance and the calculated angle to a trigonometric formula.

\* \* \* \* \*